3,458,338
LIQUID-GAS CONTACT PADS
Whitney R. Adams, Wilmington, Del., and Edgar O. Mack, Paoli, Pa., assignors to Scott Paper Company, Philadelphia, Pa., a corporation of Pennsylvania
No Drawing. Continuation of application Ser. No. 319,652, Oct. 29, 1963. This application Mar. 14, 1967, Ser. No. 623,136
Int. Cl. C09d 5/00; B44d 1/08
U.S. Cl. 117—33                                   4 Claims

ABSTRACT OF THE DISCLOSURE

A flexible, wettable and permeable material, for use in humidifiers and the like, comprising a body of reticulated urethane foam coated with a flexible adhesive to which fiber flocks are adhered substantially uniformly throughout the cross-section of the foam body to substantially increase the wettable surface of the foam without impairing its permeability.

---

This application is a continuation of patent application Ser. No. 319,652, filed Oct. 29, 1963, now abandoned.

This invention pertains to novel liquid-gas contact pads, more specifically, this invention pertains to a novel pad adaptable for use in an evaporative cooler or in a humidifier, or any application where a liquid and gas contact is desired such as in demisting.

Prior art evaporative cooler filters have been generally made from aspen wood excelsior. Aspen wood has a high sugar content. As a result, it supports growth of bacteria conveyed by air or liquids and the cooler pad soon takes on a very objectionable swamp-like odor. For this reason, the aspen excelsior coolers are often termed "swamp coolers." At the same time, the aspen pad is very hard to clean and even after the cleaning the odor remains. Further, the pad is not very efficient due to its anisotropic nature, and poor "wetting out" properties.

In areas where the mineral content of the water is high, mineral deposits develop within a very short time (in some areas within two weeks). The deposits are very hard to remove from the aspen pad. Still other detrimental effects of prior aspen pads militate against their use, such as, low surface area, channeling of water and air, previously mentioned general degradation, and the poor "wetting out."

Another type of cooler pad is an aluminum mesh. It appears to be less efficient than the aspen wood pad. Additionally, it is sufficiently hydrophobic to require a coating possessing wettant type properties. Mineral deposits are very hard to remove therefrom. Surface area of various aluminum meshes is rather small compared with the novel reticulated polyurethane pad. Small surface area materials require generally thick pads and thus the efficiency of the pad suffers.

It has now been discovered that reticulated polyurethane foam, properly treated with a hydrophilic material and made into a pad or filter or liquid-gas contacting medium, possesses certain advantages over prior art evaporative cooler pads. As one of the advantages, the polyurethane pad is rot resistant; it does not offer a ready medium for growth of microorganisms. Reticulated polyurethanes are substantially isotropic, even though the individual cells are anisotropic in orientation, and thus, the whole pad structure, properly covered with proper wettant materials, participates in the evaporative action. Pads made from reticulated polyurethane foam can be kept clean of calcification deposits by merely flexing the pad and breaking out the deposits. Wringing of the wet pad cleans it in a very short time. Other advantages will become evident as the novel pad is described.

Reticulated polyurethane foams may be made in a wide range of controlled pore sizes. For example, foam pads having pore sizes from about 6 pores per linear inch to over 125 pores per linear inch (p.p.i.) may be made. This wide range of pore sizes permits selection of the most effective pad for a given set of conditions. Foam pads with about 10 p.p.i. to about 45 p.p.i. are preferred, about 10 p.p.i. to about 25 p.p.i. represents the most preferred range for evaporation and humidification.

The total surface area of the urethane strands in the foam pad is about 150 square feet per cubic foot of the 10-pore per inch (p.p.i.) foam. It is about 420 square feet per cubic foot for the 25 p.p.i. foam and about 925 square feet per cubic foot for the 50 p.p.i. foam. This unusually high surface area in a highly porous material makes an exceptionally efficient gas-liquid contacting medium under conditions where the liquid can be caused to disperse over and wet the strand surfaces.

While certain types of reticulated polyurethane foam are somewhat hydrophilic (urethane foams are normally hydrophobic) and do have surface irregularities giving them a certain degree of wetting and liquid retaining properties, vastly improved results are achieved by coating, such as by immersion, or spraying the individual strands of the pad with flexible adhesive and then conveying, by means of an air current, short hydrophilic fibers into the foam. Alternatively, the pads may be treated with an adhesive and beaten by a rapid oscillating type of beater while at the same time the short fibers are distributed over the surfaces of the individual strands. The proper treatment of the strands is important as uneven fiber distribution, hydrophobic fibers, improper adhesive and liquid "hold-up" cause less efficient operation. It is not necessary that the short hydrophilic fibers cover the entire strand network of the foam pad. Improved efficiency will result if only one surface of the pad is treated with the fiber element. Both surfaces, of course, will considerably improve the results, while complete covering of all strands without clogging will yield the best results.

Suitable adhesives are rubber latexes obtained from Goodrich Rubber Company or U.S. Rubber Company. Acrylic ester base emulsions, such as the copolymers of butadiene, styrene, and methylmethacrylate are acceptable. These emulsions may be obtained from Rohm & Haas, Philadelphia, Pa., under the trade name of Rhoplex, such as for example, Rhoplyex E-32.

Another adhesive suitable for making the novel pad is a polyurethane adhesive offered by Thiokol Chemical Company under the trademark "Unithane."

Still another adhesive is Orthac NE-15, a polyvinyl chloride emulsion, made by American Aniline and Extract Company, Philadelphia, Pa.

If the foam pad elements are structurally weak or soft, they may be stiffened by changing the starting materials of the foam or by coating the surface of the foam with suitable compounds. This eliminates the support elements in some applications.

The hydrophilic or hydrophobic fibers previously mentioned may be inorganic fibers, such as asbestos, feldspar, milled and coated (or uncoated) glass wool fibers (available from Owens-Corning-Fiberglas), and like mineral powders, fibers and particles. A particularly advantageous glass wool is available from Eagle-Picher Company, Cincinnati, Ohio. This wool is fine milled; i.e., from 3 to 5 microns in diameter and up to 2000 microns in length and sold under the trademark "Superglas."

Organic types of fibers treated to resist bacterial degradation are cotton, rayon, linen, wool cellulose powders ($\alpha$-cellulose) and other inexpensive mixtures of organic and inorganic materials suitable for increasing the evaporative rate of the cooler pad. Materials, such as the cotton fibers, are available, for example, from Microfibres, Inc., Pawtucket, R.I.; wood-cellulose containing a high percentage of $\alpha$-cellulose and known as "Solka-Floc" is available from Brown Compouny, Berlin, N.H. The last has been used with considerable success. Generally, the fibers should be about 2 mm. in length or shorter, although longer ones may be used at about 6 p.p.i. foam and shorter fibers with finer pore foam.

In addition to the above, the fiber-covered pads have interesting properties in demisting vapor-laden gases.

The following examples are given by way of illustration and are not intended to limit the invention in its broader aspects.

EXAMPLE I

A reticulated polyurethane polyester foam having 80 p.p.i. and available from Scott Paper Company, Foam Division, Chester, Pa., was treated with a 10% adhesive solution. The adhesive was obtained from Rohm & Haas and designated as HA-8 (it is an acrylic interpolymer latex-type adhesive). It was modified by adding 0.5% $NH_4Cl$ as a catalyst. The excess of adhesive was removed from the foam structure and while wet the pad was immersed in cotton fibers. The pad was agitated in order to insure the penetration of fibers into the foam. After thorough shaking and beating to remove excess fibers the pad was dried and cured at 250° F. for five minutes. The resulting product had a soft, cloth-like hand.

EXAMPLE II

A reticulated polyurethane polyester pad having about 10 p.p.i. and available from Scott Paper Company, Foam Division, Chester, Pa., was treated with a 10% solution of Rhoplex E-32 adhesive (described above).

After the pad was squeezed and partially dried it was treated with an air stream carrying cotton fibers. The resulting product had a more uniform distribution of fiber throughout the foam structure than the pad of Example I. Instead of using an air stream to carry the fibers, other means may be used, such as the previously mentioned beating or rapid pounding of the foam pad.

EXAMPLE III

For purposes of convenient evaluation, the novel reticuated foam pad of Example II was compared with the conventionally available aspen pad air cooler. The pads were compared in a Travelair Model 961 portable room cooler, availble from Metal Air Products Company, a division of McGraw-Edison Company, Phoenix, Ariz., having a 2" thick aspen excelsior pad. A foam pad of 1½" and of the same size as the aspen pad was compared under conditions listed in the table below. The efficiency ($E_h$) was calculated according to the following formula:

$$\text{Percent } E_h = \frac{T_1 - T_2}{T_1 - T_w} \times 100$$

where:

$T_1$ = Temperature of warm air entering the evaporator pd, ° F.
$T_2$ = Temperature of cooled air emerging from the cooler pad, ° F.
$T_w$ = Wet bulb temperature, ° F.

TABLE I.—EVAPORATION EFFICIECNY OF ASPEN AND RETICULATED POLYURETHANE FOAM COOLER PADS

| Type of Pad | $T_1$, ° F. | $T_2$, ° F. | $T_w$, ° F. | Rela. humid., percent | Water evap., lb./hr./pad [1] | Pres. drop ins. $H_2O$ [2] | Effic., percent |
|---|---|---|---|---|---|---|---|
| Aspen excelsior 2" thick [1] | 70.5 | 67.0 | 64.5 | 68 | 2.41 | 0.17 | 54 |
| Polyurethane foam treated with cotton fibers 10 p.p.i. 1½" thick.[1] | 70.5 | 66.5 | 64.5 | 72 | 2.55 | 0.17 | 64 |
| Aspen excelsior 2" thick [1] | 90 | 79.5 | 75.0 | 49 | 5.15 | 0.16 | 71 |
| Polyurethane foam treated with cotton fibers 10 p.p.i. 1½" thick.[1] | 90 | 79.5 | 75.0 | 49 | 5.64 | 0.16 | 73 |

[1] Pad area is about 1.5 square feet.  [2] The pressure drop was measured with an inclined manometer.

The above data indicate that at lower temperatures the foam pad operates considerably more effectively despite the fact that it is only 1½" thick as against the 2" thick aspen pad. Good performance has been observed with a 1" pad; this is probably a result of less water being "held up" (flooding) in the pad. i.e., even better water distribution is achieved than in the 1½" polyurethane pad.

At higher temperatures, the novel pads are also more effective and offer in addition to the efficiency, the advantage of odorless evaporation, washability, re-use and ease of removal of calcification or mineral deposits. The last may also be removed by means of soaking the foam in vinegar thereby dissolving the deposits. It is obviously a more expensive manner of achieving the same result as flexing, breaking out the deposits and washing the foam pad.

It is also noted that the integral and uniform structure of the polyurethane foam pad allows use of less supporting structure and eliminates the need for an expensive wire envelope for holding the aspen excelsior in place. Further, the higher efficiencies, more uniform contacting of liquid and gas has resulted in improved safety in household appliance operations, such as in operating evaporative coolers and humidifiers. Appliances carrying the present pads have UL Class II approval. Prior art aspen pad appliances do not.

What we claim is:

1. A flexible, hydrophilic structure of high permeability adapted for use in humidifying and cooling apparatus comprising: a unitary body of flexible, reticulated polyurethane foam having a pore size in the range from about 6 to about 45 pores per lineal inch and made up of a multiplicity of cell-forming strands of polyurethane, a flexible adhesive distributed throughout said body and substantially covering said strands without clogging the pores of the body, and a plurality of flexible fibers substantially uniformly dispersed throughout the cross-section of said foam body and attached to said strands by said adhesive, said fibers being of a length sufficient to protrude from the adhesive on said strands to substantially increase the wettable surface of said strands and of a length less than the pore size of the body so as to not impair the permeability of said body.

2. A structure as set forth in claim 1 wherein said polyurethane foam is a polyester-type polyurethane and the pore size thereof is in the range from about ten to about twenty-five pores per lineal inch.

3. A structure as set forth in claim 1 wherein said fibers are cotton fibers.

4. A structure as set forth in claim 2 wherein said fibers are cotton fibers approximately 2 mm. in length.

References Cited

UNITED STATES PATENTS

| | | | |
|---|---|---|---|
| 2,920,983 | 1/1960 | Bugosh | 117—98 |
| 2,955,064 | 10/1960 | Frohmader | 261—94 X |
| 2,964,421 | 12/1960 | Rockoff | 117—98 X |
| 2,964,424 | 12/1960 | Mast | 117—98 |
| 2,966,960 | 1/1961 | Rochlin | 55—522 X |
| 2,991,843 | 7/1961 | Bell | 55—522 X |
| 3,013,901 | 12/1961 | Bugosh | 117—98 X |
| 3,123,456 | 3/1964 | Boltz et al. | 55—522 X |
| 3,149,626 | 9/1964 | Wentling et al. | 261—94 X |
| 3,171,820 | 3/1965 | Volz | 261—94 X |
| 3,215,584 | 11/1965 | McConnell et al. | 117—33 X |
| 3,246,767 | 4/1966 | Pall et al. | 117—98 X |
| 3,249,465 | 5/1966 | Chen | 117—98 |
| 3,285,586 | 11/1966 | Powers | 261—92 |

WILLIAM D. MARTIN, Primary Examiner

E. J. CABIC, Assistant Examiner

U.S. Cl. X.R.

55—233, 524, 527; 117—98, 138.8; 261—94, 100